United States Patent Office 3,456,915
Patented July 22, 1969

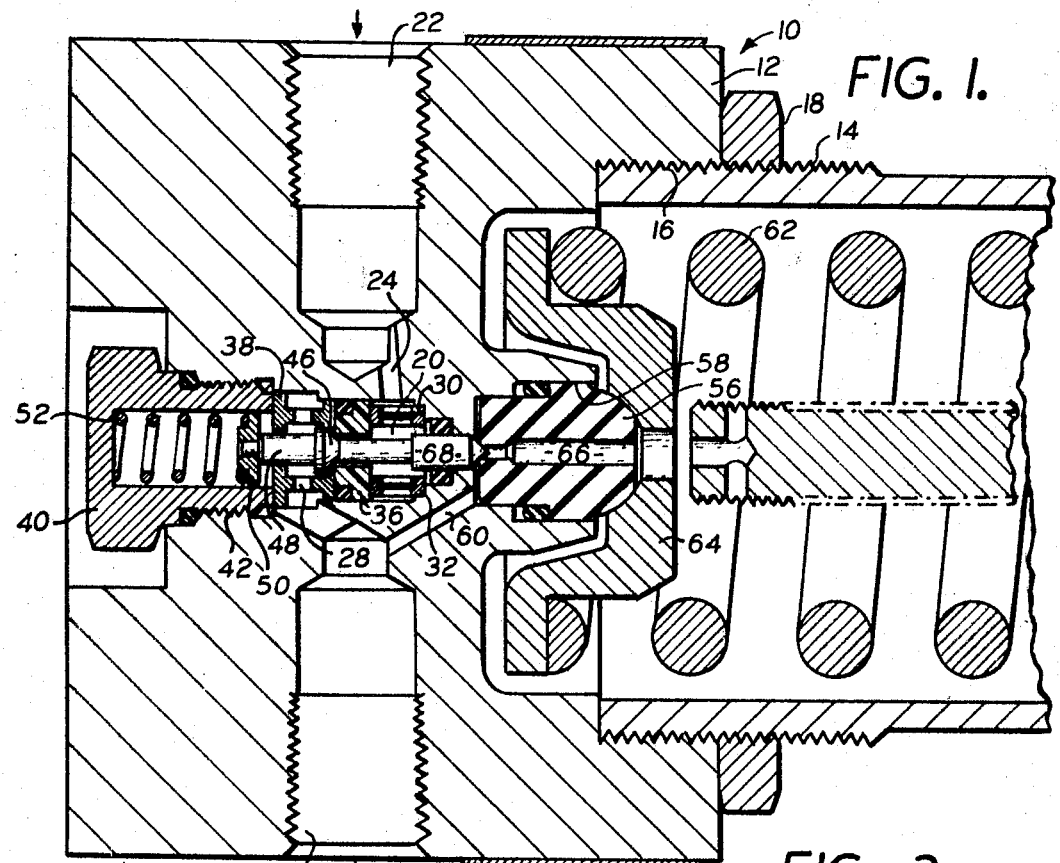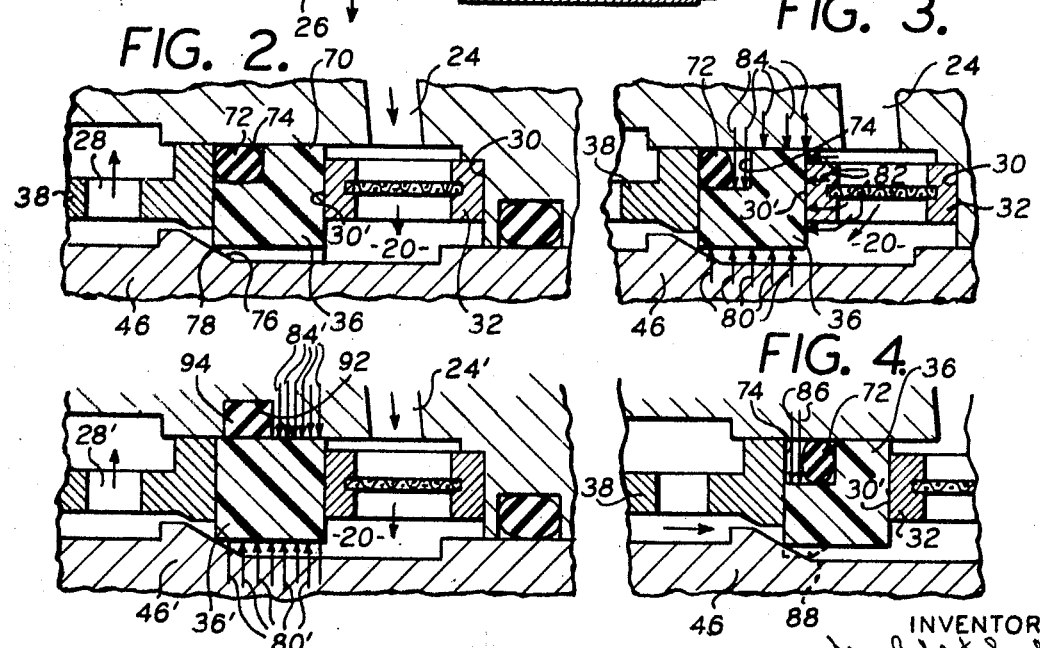

3,456,915
VALVE SEATS FOR HIGH PRESSURE VALVES
Sam Robert Smolen, Bloomingdale, N.J., assignor to Marotta Valve Corporation, Boonton, N.J., a corporation of New Jersey
Filed Feb. 9, 1966, Ser. No. 526,164
Int. Cl. F16k *1/36, 39/02*
U.S. Cl. 251—282                          8 Claims

ABSTRACT OF THE DISCLOSURE

The poppet valve disclosed in this specification seats against a plastic ring which fits into a valve chamber to close one end of the valve chamber. The clearance between the outer circumference of the ring and the wall of the chamber is sealed by an O-ring and this O-ring is placed at the downstream side of the ring so that the rest of the outside circumference of the ring is exposed to the upstream pressure of the valve chamber. The valve element seats against the downstream end of the ring and thus the passage through the ring is also subjected to the upstream pressure. Thus the radial pressures on the ring seat are balanced so that the effective seating area of the valve element remains unchanged in spite of variations in pressure. By having a valve stem extension, of the same effective area as the seat through a seal at the other end of the chamber, an accurately pressure-balanced valve structure is obtained.

SUMMARY OF THE INVENTION

This invention relates to valve seats for high-pressure valves.

It is an object of the invention to provide an improved construction for plastic valve seats. Another object is to correlate a plastic valve seat and its sealing ring with the direction from which the high pressure is exerted so that the seat will function satisfactorily without requiring reinforcing rings for preventing distortion of the plastic. When applied to valves having a high pressure differential across the valve, the invention is suitable for valve assemblies where the higher pressure is always from the same direction, as in the case of pressure regulators.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:

FIGURE 1 is a fragmentary sectional view of a pressure regulator equipped with a valve made in accordance with this invention;

FIGURE 2 is a greatly enlarged diagrammatic view of a portion of the structure shown in FIGURE 1;

FIGURES 3 and 4 are diagrams illustrating the principle of this invention and showing the importance of having the pressure exerted in one direction only; and FIGURE 5 is a view similar to FIGURE 2 but showing a modified form of the invention.

DESCRIPTION OF THE PREFERRED EMBODIMENT

FIGURE 1 shows a pressure regulator 10 including a housing 12 with an extending portion 14 which is secured to the main portion of the housing by threads 16 and which is locked in position by a lock nut 18.

The housing 12 encloses a valve chamber 20. An inlet opening 22 in the housing 12 communicates with the valve chamber 20 through an inlet passage 24. An outlet opening 26 on the delivery side of the regulator communicates with the valve chamber 20 through a delivery passage 28.

The valve chamber 20 has a shoulder 30 at one end. A filter 32, which serves as a spacer, abuts against the shoulder 30. A valve seat 36 contacts with the end of the filter remote from the shoulder 30; and there is a retainer 38 on the side of the valve seat 36 opposite the filter or spacer 32. The assembly is clamped together by a plug 40 which screws into threads 42 in a counter bore in the end of the housing 12 beyond the valve chamber 20. The end face of the retainer 38 provides a shoulder in contact with the downstream end of the valve seat 36 and extending across most of the radial width of the end face of the valve seat. The end face of the spacer 32 provides a similar shoulder 30' in contact with the upstream end of the valve seat, best shown in FIGS. 2–5.

A poppet valve element 46 is located in the chamber 20 and seats against the downstream side of the valve seat 36. The valve element 46 has a stem 48 in contact with a washer 50; and there is a coil spring 52 within the hollow interior of the plug 40 and clamped between an end of the plug 40 and the washer 50. This spring 52 urges the valve element 46 into closed position in contact with the seat 36.

A piston 56 slides in a cylindrical chamber 58 in one end of the housing 12. The portion of the chamber 58 to the left of the piston 56 provides the sensing pressure space of the reglator and this space communicates through a passage 60 with the outlet opening 26 or any other space that is subject to the downstream pressure of the regulator. A spring 62 urges a support 64 against the piston 56 to move the valve element 46 out of contact with the valve seat 36 and into open position. The valve 46 closes when the force of the spring 52 plus the force of the downstream pressure against the piston 56, is sufficient to overcome the force of the spring 62. This pressure regulator operation is well understood in the art.

The construction shown in FIGURE 1 includes a pressure relief feature. A passage 66 through the piston 56 is ordinarily closed by an extension 68 of the valve stem; but sufficient rise in pressure in the sensing pressure chamber to the left of the piston 56, after the valve element 46 is closed, causes the piston 56 to move away from the extension 68 of the valve stem so that fluid can escape through the passage 60 and through the space to the left of the piston 56, into the vent passage 66.

The valve seat 36 is held firmly against the shoulder 30' by pressure of the retainer 38. The valve seat 36 is preferably made of plastic material having a Rockwell hardness within the range of about R100 to R120; a tensile strength of 6,000 pounds per square inch minimum; a modulus of elasticity between about 150,000 and 500,000 pounds per square inch; and a flexural modulus of about 100,000 to 600,000 pounds per square inch.

Plastic materials particularly well suited for the seat and that come within the desired range of physical characteristics include polyamide (nylon); chlorotrifluoroethylene (Kel-F); the General Electric Company polycarbonate "Lexan"; and the Allied Chemical plastic "Halon." These are illustrative materials and there are other suitable plastics having the desired characteristics.

In order to prevent leakage of pressure around the outside of the plastic ring that comprises the valve seat 36, there is a sealing ring 72, preferably an O-ring, located in a groove 74. This groove 74 opens through the circumferential face 70 and also through the face of the seat 36 at the end remote from the shoulder 30'. In accordance with the conventional practice, the O-ring 72 is squeezed between the wall of the valve chamber 20 and the bottom of the groove 74, but the groove 74 has an axial width somewhat greater than the width of the O-ring.

The valve element 46, being a poppet valve, has a tapered face 76 which seats against an inside corner 78 of the seat 36.

The corner 78 is as sharp as machining of the material will permit, but the actual area of contact of the conical surface 76 is increased somewhat by some compression of the plastic of the seat 36 under pressure from the valve element 46. This pressure is sufficient to prevent leakage of fluid from the inlet passage 24 past the valve element 46 to the delivery passage 28; and the ring 72 prevents leakage of fluid around the outside of the seat 36, as already explained.

FIGURE 3 illustrates the principle of the invention with high pressure supplied from the inlet passage 24 to the portion of the valve chamber 20 on the upstream side of the valve element 46. The plastic seat 36 is a ring and is illustrated in the drawing as a ring of rectangular cross section and substantially square except for the groove 74. High pressure is exerted against the inside surface of the valve seat ring around its entire circumference, as illustrated by the arrows 80. High pressure is exerted by the fluid in the clearance between the valve seat 36 and the shoulder 30, as illustrated by the arrows 82. This end pressure, represented by the arrows 82, merely reduces the clamping force of the seat 36 against the shoulder 30'.

High pressure is also exerted against the circumferential face 70 and the bottom of the groove 74, as indicated by the arrows 84. When the valve element 46 is in closed position, the pressure represented by the arrows 80, 82 and 84 is the same.

FIGURE 3 shows the O-ring 72 distorted by the high pressure in the groove 74 to the right of the O-ring and this distortion of the O-ring causes the O-ring to effectively seal against any flow of fluid beyond the O-ring. It will be apparent that the pressure distribution shown in FIGURE 3 does not distort the valve seat 36 substantially or cause any permanent change in the shape of the seat.

FIGURE 4 illustrates the reason that the high pressure must always come from the right with the construction shown in FIGURE 3. In FIGURE 4 the high pressure is shown as coming from the left. The O-ring 72 moves to the right-hand side of the groove 74 to seal against flow of fluid around the outside of the valve seat 36. There is end pressure against the valve seat 36 urging it toward the right in FIGURE 4 and increasing its pressure against the shoulder 30. This axial pressure is not harmful. There is radial pressure, however, against the bottom of the groove 74 and this radial pressure is not counterbalanced by any pressure against the inside cylindrical face of the valve seat 36 because the pressure on the right of the valve element 46 is the low pressure under the conditions assumed in FIGURE 4. The combination of the inward radial pressure, as represented by the arrows 86 in FIGURE 4, added to the inward radial pressure exerted by the distorted O-ring 72, is sufficient to distort the plastic of the seat 36 to the location represented by an area 88 outlined in dotted lines in FIGURE 4. This distortion of the valve seat 36 reduces the open area through the seat when the valve is open, but the more important effect is that it distorts the area of the valve seat which is in contact with the valve element 42 and increases the area of contact so that the sealing pressure between the valve element 46 and the seat 36 is substantially reduced. For service where there is a high pressure differential across the valve when the valve is in closed position, the construction shown in FIGURE 3 must be used with the valve seat on the high pressure side of the valve element.

In the case of pressure-balanced devices such as regulators with solenoid valves operating at high pressure, distortion of the seat changes the internal diameter of the seat and results in loss of balance of forces. In a pressure-sensitive device (regulator), the regulation is affected and in solenoid valves, larger forces to operate the unit are necessary (a bigger solenoid).

FIGURE 5 shows a modification of the construction shown in FIGURE 2. The construction is the same as FIGURE 2 except that a seat 36' is constructed without an O-ring groove. Parts of the assembly that correspond with FIGURE 2 are indicated by the same reference character with a prime appended. In place of the O-ring groove in the valve seat of FIGURE 2, the construction shown in FIGURE 5 has an O-ring groove 92 in which there is an O-ring 94. No high pressure gets behind the valve seat 36', which is not counterbalanced by equal pressure within the valve chamber 20 on the inside surface of the valve element 36'. Although the valve seats illustrated in the drawing are of rectangular cross section, and this shape is advantageous for strength and for manufacturing technique, it will be understood that the same pressure balancing would occur even though the inside surface of the ring forming the valve element 36 or 36' were curved axially instead of being straight, as in the constructions illustrated.

The preferred embodiments of the invention have been illustrated and described, but changes and modifications can be made and some features can be used in different combinations without departing from the invention as defined in the claims.

What is claimed is:

1. In a balanced valve assembly having a housing enclosing a chamber, a plastic seat ring at one end of the chamber extending inward from the wall of the chamber and forming a partition with a center opening, a tapered poppet valve element for closing the opening, the valve element extending beyond the inner limits of the ring and seating against a portion of the downstream end of the ring when the valve element is in closed position, a seal located in an opening in the other end of the chamber in alignment with the opening through the ring, the valve element having a stem extending through the seal, and the cross section of the opening through the seal and the part of the stem that extends through said opening through the seal being substantially the same as the effective area of the valve element that is exposed to pressure of the chamber through the center opening of the ring when the valve element is seated against the ring, a shoulder in the housing and against which the downstream end of the plastic ring abuts, the seat having a circumferential surface that confronts a corresponding surface of the chamber wall, a space adjacent to the downstream end of the seat ring between the confronting faces for a sealing ring to prevent leakage between the circumferential surface of the seat ring and the confronting face of the chamber wall surface, a sealing ring in said space adjacent to the downstream end of said plastic ring, a high pressure fluid supply passage opening into the chamber at a location between the upstream side of the ring and the other end of the chamber that has the seal around the stem, and a fluid outlet passage opening through the wall of the chamber on the downstream side of the ring.

2. The valve assembly described in claim 1 characterized by the space for the sealing ring being formed by a portion of the plastic ring that is of less diameter than the confronting circumferential surface of the chamber at the downstream end of the ring.

3. The valve assembly described in claim 2 characterized by the radial cross section of the seat ring being generally square except for the reduced diameter and said reduction in diameter having a radial depth not greater than one-half of the radial depth of the ring.

4. The valve assembly described in claim 1 characterized by the valve assembly being a pressure regulator, pressure-responsive means for operating the valve element, a sensing pressure chamber for the pressure-responsive means, a passage leading from the sensing pressure chamber to a space that receives fluid from said fluid outlet passage.

5. The valve assembly described in claim 1 characterized by the plastic ring having a radial thickness at least as great as approximately the diameter of the opening through the ring.

6. The valve assembly described in claim 1 characterized by the axial length of the ring being substantially equal to its radial thickness.

7. The valve assembly described in claim 1 characterized by the ring being made of material from the group consisting of nylon, Kel–F, Lexan and Halon.

8. The valve assembly described in claim 1 characterized by the plastic ring being made of material having a Rockwell hardness within the range of about R100 to R120; a tensile strength of 6,000 pounds per square inch, minimum; a modulus of elasticity between about 150,0000 and 500,000 pounds per square inch; and a flexural modulus of about 100,000 to 600,000 pounds per square inch.

References Cited

UNITED STATES PATENTS

| | | | |
|---|---|---|---|
| 2,950,081 | 8/1960 | Steinbuch | 251—368 XR |
| 2,989,990 | 6/1961 | Bass | 251—368 XR |
| 3,102,549 | 9/1963 | Worden | 137—116.5 XR |
| 3,137,476 | 6/1964 | Rotheraine | 251—368 XR |
| 3,181,560 | 5/1965 | Worden | 137—116.5 XR |

ALAN COHAN, Primary Examiner

WILLIAM H. WRIGHT, Assistant Examiner

U.S. Cl. X.R.

137—116.5; 251—363